United States Patent [19]

Asquith

[11] 4,052,770
[45] Oct. 11, 1977

[54] METHOD AND APPARATUS FOR SEVERING THIN-WALLED TUBING ON A MANDREL

[75] Inventor: Dixon Redfern Asquith, Danville, Ill.

[73] Assignee: The Continental Group, Inc., New York, N.Y.

[21] Appl. No.: 711,040

[22] Filed: Aug. 2, 1976

[51] Int. Cl.² .................. A22C 11/02; A22C 13/02
[52] U.S. Cl. ............................................ 17/42; 17/49
[58] Field of Search ............... 17/42, 49, 45; 83/193

[56] References Cited

U.S. PATENT DOCUMENTS

| | | | |
|---|---|---|---|
| 3,110,058 | 11/1963 | Marbach | 17/42 |
| 3,112,517 | 12/1963 | Ives | 17/42 |
| 3,503,093 | 3/1970 | Marbach | 17/42 |
| 3,704,483 | 12/1972 | Urbutis et al. | 17/42 X |
| 3,936,909 | 2/1976 | Carter | 17/42 |
| 3,942,221 | 3/1976 | Sipusic et al. | 17/42 |

*Primary Examiner*—David H. Brown
*Attorney, Agent, or Firm*—John J. Kowalik; Joseph E. Kerwin; William A. Dittmann

[57] ABSTRACT

An improved method of severing a strand of shirred casing or the like from the following casing while the casing moves along a mandrel, comprising the steps of gripping the shirred casing at two axially separated points, extending the casing to deshirr a portion thereof, gripping the deshirred portion of the casing, and axially tensioning the deshirred portion to effect a parting therein.

A cam-actuated, double clamp mechanism is also provided to practice the method.

9 Claims, 11 Drawing Figures

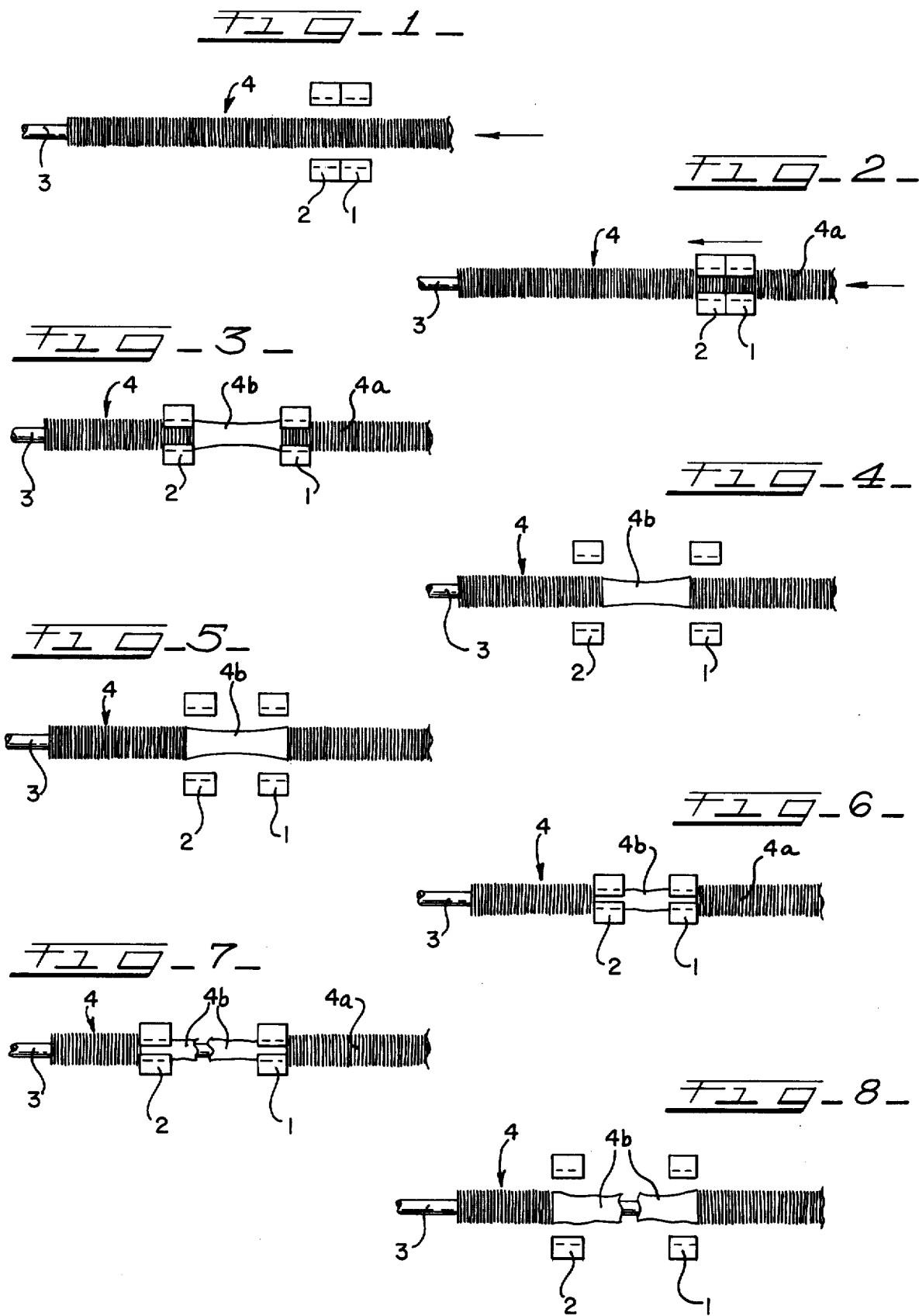

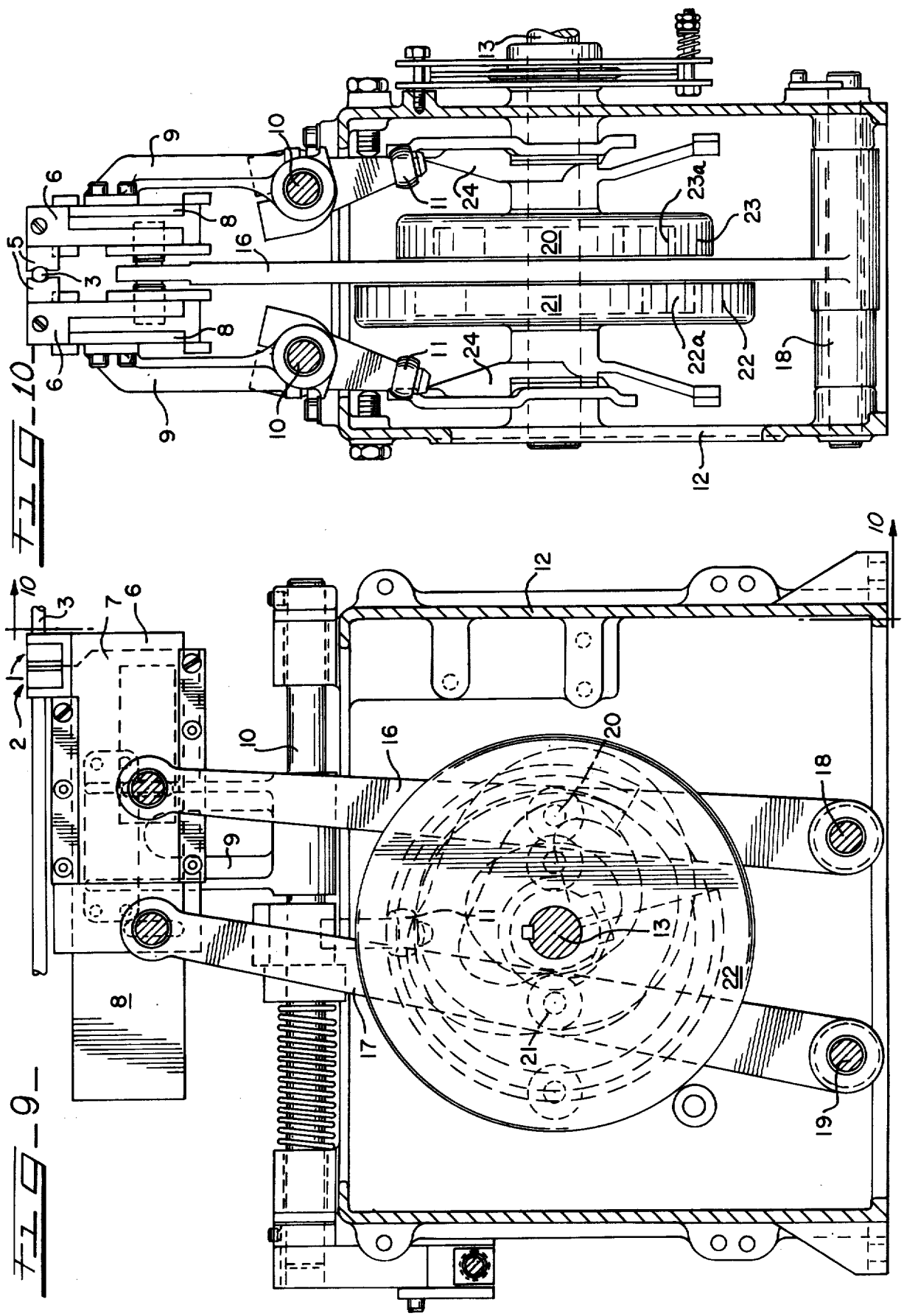

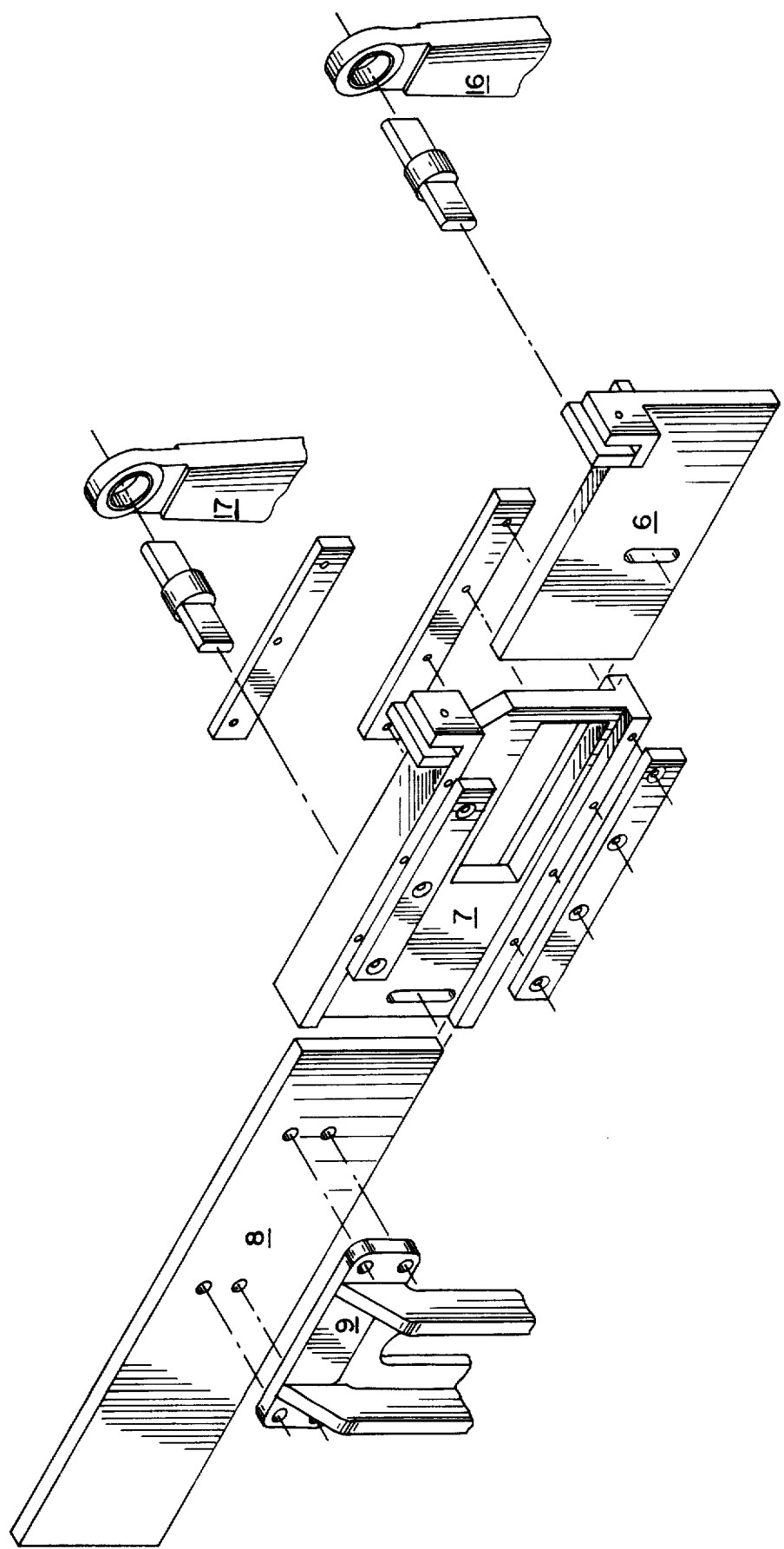

METHOD AND APPARATUS FOR SEVERING THIN-WALLED TUBING ON A MANDREL

BACKGROUND AND SUMMARY OF THE INVENTION

The present invention relates to thin-walled tubular material such as sausage casing, and more particularly, to a method and apparatus for severing a thin-walled tubular material of indefinite length advancing about a support mandrel, into a plurality of segments of predetermined length.

When a predetermined length of tubular casing has been shirred on a shirring mandrel, separation thereof from a supply of said casing is desired so that individual sticks of compressed, shirred casing can be prepared and then removed from about the mandrel. Some typical methods of severing a length of shirred tubular casing from the casing supply are described in U.S. Pat. Nos. 3,110,058 (Marback), 3,112,517 (Ives) and 3,942,221 (Sipusic et al).

The advent of automatic stuffing machines has made important the integrity of the shirred sticks. Loss of integrity necessitates corrective manual operations, which slow production and increase costs. Further, it is desirable that a consistent shirring pattern be maintained throughout the stick, including the ends thereof, to insure uniform eversion during the stuffing operation and, therefore, a uniform product.

It is therefore a primary object of the present invention to provide an improved method of severing a strand of shirred casing from the following casing while the casing moves along a mandrel.

It is a further object to provide a severing method which avoids damage to the severed strand.

It is another object to provide a severing method which yields a strand having a consistent shirring pattern along the entire length thereof.

These objects are accomplished by a method involving deshirring a portion of the shirred casing and then tensioning the deshirred casing to effect a parting thereof. More specifically, a pair of clamping members are utilized to first extend the shirred casing along the mandrel and then grip and tension the deshirred portion to effect separation.

It is still another object of the present invention to provide a device to practice the above-described method.

It is still another object to provide a severing device which is compatible with existing shirring equipment.

These objects are accomplished by utilizing a pair of double-jawed clamping members adapted to grip the shirred casing at two points along the axis thereof for deshirring the casing therebetween, and being further adapted to grip the deshirred casing at two points along the axis thereof for effecting a separation therebetween.

BRIEF DESCRIPTION OF THE DRAWINGS

The various features and advantages of the method and device of the present invention will be more readily apparent from the following detailed description when considered in connection with the accompanying drawing wherein:

FIGS. 1-8 illustrate in sequence the steps of the method of the present invention.

FIG. 9 is a cross-sectional view of the apparatus of the present invention.

FIG. 10 is a cross-sectional view taken substantially along line 10—10 of FIG. 9.

FIG. 11 is a fragmentary isometric view of the slide mechanism of the present invention.

DESCRIPTION OF THE PREFERRED EMBODIMENT

In the practice of the method of the present invention, there are provided paired clamping members 1 and 2 movably disposed along the axis of a support mandrel 3. Shirred casing 4 moves continuously along the mandrel 3 at a predetermined speed.

As illustrated in FIG. 1, the severing process commences with the clamping members 1 and 2 open and closely adjacent each other at the rearward position.

The clamping members 1 and 2 are closed to grip the shirred casing 4 at two points along the axis thereof and are then displaced in the direction as indicated in FIG. 2 at a speed less than the predetermined speed of the unobstructed shirred casing. The slowly moving clamping members 1 and 2 are thus serving, at this point, as holdback members to compress the following portion 4a of the shirred casing 4.

After a suitable period, the speed of the forward clamping member 2 is increased to a value in excess of the predetermined speed, while the speed of the rearward clamping member 2 is increased to a level equalling the predetermined speed. As a result of the disparity of their speeds, the forward and rearward clamping members 1 and 2 become axially separated, resulting in extension or deshirring of the casing 4b therebetween, as shown in FIG. 3.

After the portion 4b of the casing has been deshirred, the clamping members 1 and 2 open, releasing their grip on the shirred casing 4.

Upon release of the shirred casing 4, the direction of movement of the forward clamping member 2 is reversed, and the speed of the rearward clamping member 1 is increased, whereby the two members 1 and 2 are caused to converge.

When the members 1 and 2 are in position overlying the deshirred portion 4b of the casing, they are closed to grip the deshirred casing 4b.

Upon gripping the deshirred casing 4b, the forward clamping member 2 is displaced along the axis of the mandrel 3, as shown in FIG. 7, at a speed in excess of the predetermined speed. At the same time, the rearward clamping member 1 is displaced along the mandrel 3 at a speed less than the predetermined speed. Again, as a result of the disparity of their speeds, the forward and rearward clamping members 1 and 2 become axially separated, resulting in tensioning and ultimately parting of the deshirred casing 4b therebetween. The slowly moving rearward clamping member 1 again serves as a holdback member to compress the following portion 4a of the casing.

After parting of the casing, the clamping members 1 and 2 open, releasing their grip on the casing 4. The members 1 and 2 are now in the fully forward position as shown in FIG. 8.

Upon release of the parted casing, the clamping members 1 and 2 again reverse direction of movement and return to the rearward, open position, as illustrated in FIG. 1, to repeat the cycle.

As shown in FIGS. 9 through 11, there is provided an apparatus for practicing the above-described method in conjunction with a shirring machine of the type described in U.S. Pat. No. 3,112,517 (Ives).

The apparatus comprises rearward and forward clamping members 1 and 2, means for axially displacing the members 1 and 2 along the mandrel 3 and means for engaging and disengaging the members 1 and 2 with a casing 4 moving along the mandrel 3.

The clamping members 1 and 2 include paired, opposing jaws 5, formed of a resilient material such as urethane, and detachably mounted on paired front and rear clamp sides 6 and 7, respectively. As best seen in FIG. 11, the clamp slides 6 and 7 are affixed to slide bars 8 so as to permit relative axial motion therebetween. The slide bars 8 are attached to roller head track brackets 9 which, in turn, are keyed to shafts 10 for co-rotation therewith, as are face cam followers 11. Located below the shafts 10 is a housing 12 having therein a drive shaft 13 substantially transverse the mandrel 3. The drive shaft 13 is driven by a motor (not shown), preferably of the electric or pneumatic type. Box cams 22 and 23 and face cams 24 are keyed to the drive shaft 13 and control the axial and radial displacement of the clamping members 1 and 2 as will be more fully explained.

Pivotably connected to the front and rear clamp slides 6 and 7 are front and rear levers 16 and 17 respectively, which are pivoted, at the distal ends thereof, about pins 18 and 19 respectively. Box cam followers 20 and 21, mounted proximate the midpoints of the levers, are constrained to travel in channels 22a and 23a formed in the box cams 22 and 23. Thus, it will be seen that rotation of the drive shaft 13, and the box cams 22 and 23 thereon, results in displacement of the box cam followers 20 and 21. This displacement of the cam followers 20 and 21 is amplified and communicated to the clamp slides 6 and 7 through the levers 16 and 17 and provides for independent movement of the clamping members 1 and 2 along the axis of the mandrel 3.

It will further be seen that rotation of the drive shaft 13, and the face cams 24 thereon results in displacement of the face cam followers 11, which in turn effects radial displacement of the clamping members 1 and 2 through rotation of the shafts 10 and the track brackets 9 thereon. It is to be noted that the face cams 24 are identical in contour, providing for radial displacement of the clamping members 1 and 2 in unison.

Among the salient advantages of the present invention is the provision of a severed strand of shirred casing having a consistent shirring pattern along the entire length thereof. This is achieved by deshirring the casing, prior to separation, by axial extension so as to leave undisturbed the creases and pleats established during the original shirring process. Thus, during the further processing of the severed strand, wherein axial compression is effected for length reduction, the deshirred portions of the strand ends fold along the existing creases and reassume their initial shirred configuration.

While the preferred method of application and arrangement of parts has been shown in illustrating the invention, it is to be clearly understood that various changes in details may be made without departing from the scope and spirit of the claims appended hereto.

I claim:

1. In a machine for continuously shirring a thin-walled sausage casing or the like on a mandrel, an improved device for severing a strand of the shirred casing from the following shirred casing while the casing moves along the mandrel, said device including means for separating adjacent folds of the shirred casing to provide an extended portion along the mandrel and for tensioning the extended portion to effect separation thereof, said means comprising paired double-jawed resilient clamping members adapted for gripping the shirred casing at two points along the axis thereof for deshirring the casing therebetween and for grasping the deshirred casing at two points along the axis thereof for effecting a separation therein.

2. In a machine for continuously shirring a thin-walled casing or the like on a mandrel, an improved device for severing a strand of the shirred casing from the following casing while the casing moves along the mandrel at a predetermined speed, said device including means for separating adjacent folds of the shirred casing to provide an extended portion along the mandrel, and for axially tensioning the extended portion to effect separation thereof, said means comprising a first double-jawed clamping member adapted to grip a first portion of the shirred casing and prevent that portion and all following portions from moving along the mandrel at a speed greater than the predetermined speed, and a second double-jawed clamping member adapted to grip a second portion of the shirred casing and move along the mandrel at a speed greater than the predetermined speed, whereby a portion of the shirred casing between said clamping members is deshirred, said first clamping member being further adapted to grip the deshirred portion of the casing and prevent the portion being gripped and all following portions from moving along the mandrel at a speed greater than the predetermined speed, said second clamping member further being adapted to grip the deshirred portion of the casing and move along the mandrel at a speed greater than the predetermined speed, whereby separation of the deshirred casing between said clamping members is effected.

3. In a machine for continuously shirring a thin-walled casing or the like on a mandrel, an improved device for severing a strand of the shirred casing from the following casing while the casing moves along the mandrel at a predetermined speed, said device including paired clamping members, means causing said clamping members to grip the shirred casing, means causing said clamping members to axially separate, whereby a portion of the casing is deshirred, means causing said clamping members to converge and grip the deshirred portion of the casing, and means causing said clamping members to again separate, whereby parting of the deshirred casing between said members is effected.

4. An improved method for severing a strand of shirred casing or the like from the following casing while the casing moves along a mandrel, comprising in combination the steps of:
 a. gripping the shirred casing at two points along the axis thereof;
 b. axially separating said two points to deshirr casing therebetween;
 c. releasing the grip at said two points;
 d. regripping the casing at two points along the axis of the deshirred portion; and
 e. relatively displacing said two points on the deshirred portion and effect a parting of the casing therebetween.

5. An improved method for severing a strand of shirred casing or the like from the following casing while the casing moves along a mandrel at a predetermined speed, comprising in combination the steps of:
 a. gripping the moving shirred casing with first and second clamping members, said members being aligned along the axis of the mandrel;

b. axially displacing said second clamping member at a speed in excess of the predetermined speed, whereby a portion of the shirred casing is deshirred;
c. removing said clamping members from gripping said casing;
d. gripping the deshirred portion of the casing with said clamping members, said members being aligned along the axis of the mandrel; and
e. axially displacing said second clamping member at a speed in excess of the predetermined speed to effect a parting of the deshirred casing therebetween.

6. The method of claim 5, wherein said first clamping member, while in engagement with the casing, is axially displaced at a speed less than the predetermined speed.

7. The method of claim 5, wherein said second clamping member reverses direction after deshirring a portion of the casing.

8. An improved method for severing a strand of shirred casing or the like from the following casing while the casing moves along a mandrel at a predetermined speed, comprising in combination the steps of:
   a. gripping the shirred casing with first and second axially aligned clamping members, both of said clamping members traveling at a speed less than the predetermined speed;
   b. axially displacing said second clamping member at a speed in excess of the predetermined speed to separate said clamping members, whereby the casing therebetween is at least partly deshirred;
   c. removing both of said clamping members from contact with the casing;
   d. displacing said first clamping member toward said second clamping member at a speed in excess of the predetermined speed, while displacing said second clamping member toward said first clamping member;
   e. gripping the deshirred portion of the casing with said clamping members, both of said clamping members traveling at a speed less than the predetermined speed; and
   f. axially displacing said second clamping member at a speed in excess of the predetermined speed, whereby the deshirred casing between said clamping members is tensioned and a parting thereof is effected.

9. In a machine for continuously shirring a thin-walled casing or the like on a mandrel, an improved device for severing a strand of the shirred casing from the following casing while the casing moves along the mandrel at a predetermined speed, said device including means for separating adjacent folds of the shirred casing to provide an extended portion along the mandrel and for tensioning the extended portion to effect separation thereof, said means comprising a first clamping member adapted to grip a first portion of the shirred casing and prevent that portion and all following portions from moving along the mandrel at a speed greater than the predetermined speed, a second clamping member adapted to grip a second portion of the shirred casing and move along the mandrel at a speed greater then the predetermined speed, whereby a portion of the shirred casing between said clamping members is deshirred, and means associated with said clamping members for causing the same to grip the deshirred portion of the casing and tension the same to effect a parting thereof.

* * * * *